(12) United States Patent
Hsu et al.

(10) Patent No.: US 12,070,827 B2
(45) Date of Patent: Aug. 27, 2024

(54) CONTROL MECHANISM, TOOL REPLACEMENT EQUIPMENT AND TOOL REPLACEMENT METHOD

(71) Applicant: Fulian Yuzhan Precision Technology Co., Ltd, Shenzhen (CN)

(72) Inventors: Hsing-Chih Hsu, New Taipei (TW); Zhao-Yao Yi, Shenzhen (CN); Lei Zhu, Shenzhen (CN); Er-Yang Ma, Shenzhen (CN); Chih-Sheng Lin, New Taipei (TW); Ming-Tao Luo, Shenzhen (CN)

(73) Assignee: Fulian Yuzhan Precision Technology Co., Ltd, Shenzhen (CN)

( * ) Notice: Subject to any disclaimer, the term of this patent is extended or adjusted under 35 U.S.C. 154(b) by 984 days.

(21) Appl. No.: 17/033,837

(22) Filed: Sep. 27, 2020

(65) Prior Publication Data
US 2021/0291308 A1  Sep. 23, 2021

(30) Foreign Application Priority Data

Mar. 23, 2020 (CN) .......................... 202010208992.2
Mar. 23, 2020 (CN) .......................... 202010209823.0
Mar. 23, 2020 (CN) .......................... 202010209833.4

(51) Int. Cl.
*B23Q 17/09* (2006.01)
*B23Q 3/155* (2006.01)
*B23Q 17/22* (2006.01)
*G05B 19/4065* (2006.01)

(52) U.S. Cl.
CPC ....... *B23Q 17/0995* (2013.01); *B23Q 3/1554* (2013.01); *B23Q 3/15546* (2013.01); *B23Q 17/0909* (2013.01); *B23Q 17/22* (2013.01); *G05B 19/4065* (2013.01)

(58) Field of Classification Search
None
See application file for complete search history.

(56) References Cited

U.S. PATENT DOCUMENTS

2020/0238466 A1 *  7/2020  Morimura .......... B23Q 3/15513
2022/0314295 A1 * 10/2022  Watanabe ............ B21D 37/145

FOREIGN PATENT DOCUMENTS

JP          S5949858 B2    12/1984
JP          S61142038 A     6/1986
JP          S6288530 A      4/1987

* cited by examiner

*Primary Examiner* — Ryan A Jarrett
(74) *Attorney, Agent, or Firm* — ScienBiziP, P.C.

(57) ABSTRACT

Provided herein are a numerical control mechanism, a tool replacement equipment and a tool replacement method, which are used for disassembling a first tool and preparing a second tool according to a tool replacement task and replacing the first tool with a second tool, so as to realize automatic tool replacement, reduce manpower and machine waiting time for the tool replacement, and improve the tool replacement efficiency.

12 Claims, 4 Drawing Sheets

CONTROL MECHANISM, TOOL REPLACEMENT EQUIPMENT AND TOOL REPLACEMENT METHOD

FIELD

The subject matter herein generally relates to machining field, and particularly relates to a control mechanism, a tool replacement equipment and a tool replacement method.

BACKGROUND

In the field of tool machining, the tool will be worn during use. It is necessary to replace the tool that cannot be used normally, otherwise it will affect the processing of workpiece. The replacement of tools is traditionally carried out by manual operation, which may cause waste of workpieces or damage manufacturing machines due to taking wrong tools. Further, the labor intensity is large, which may cause waste of tools due to tools falling off or wrongly installing, thus increasing processing cost.

BRIEF DESCRIPTION OF THE DRAWINGS

Implementations of the present disclosure will now be described, by way of embodiment, with reference to the attached figures.

DETAILED DESCRIPTION

Figure 1:
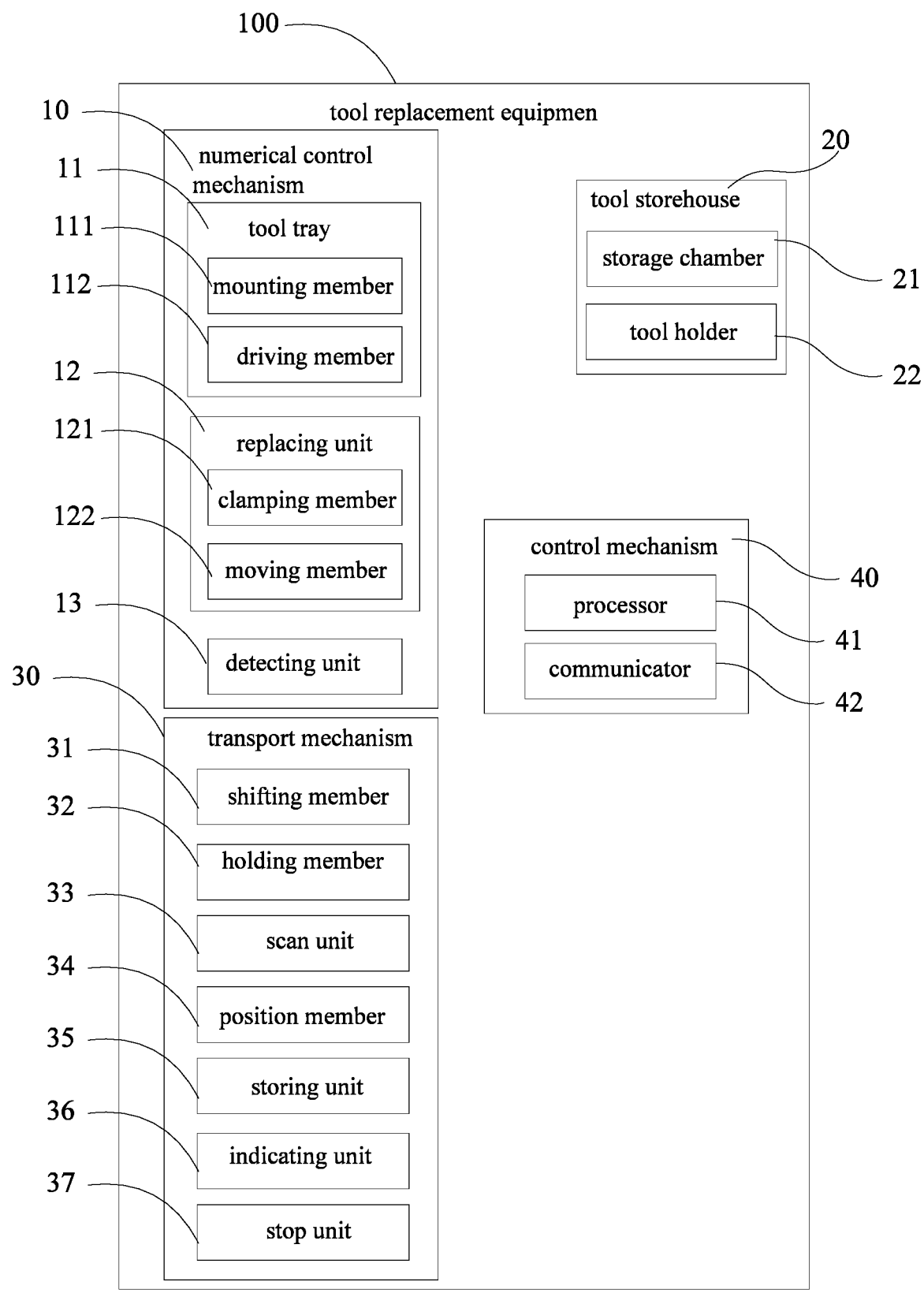
FIG. 1 is a schematic diagram of tool replacement equipment according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "multiple" means two or more, unless otherwise specifically defined.

The terms "center", "longitudinal", "horizontal", "length", "width", "thickness", "top", "bottom", "front", "back", "left", "right", "vertical", "horizontal", "top", "bottom", "inside", "outside", "clockwise needle", "anticlockwise" and other indicating directions or positions are based on the directions or positions shown in the attached drawings In order to facilitate the description of the embodiment and simplify the description of the invention, rather than indicating or implying that the device or element referred to must have a specific orientation, be constructed and operated in a specific orientation, it cannot be understood as a limitation of the embodiment of the invention.

Referring to FIG. 1, an embodiment of the present disclosure provides a tool replacement equipment 100. The replacement equipment 100 is configured to automatically replace tools that are worn after processing, or broken after processing, or after replacement process. The tool replacement equipment 100 includes a numerical control mechanism 10, a tool storehouse 20, a transport mechanism 30, and a control mechanism 40. The numerical control mechanism 10, the tool storehouse 20, and the transport mechanism 30 are in communication with the control mechanism 40 respectively. The numerical control mechanism 10 is configured to mount tools and control the tools to process workpieces. The tool storehouse 20 is configured to store new tools which can be used to replace the worn or broken tools. The transport mechanism 30 is configured to transport the new tools from the tool storehouse 20 to the numerical control mechanism 10. The control mechanism 40 is configured to control operations of the numerical control mechanism 10, the tool storehouse 20, and the transport mechanism 30.

The control mechanism 40 may include a processor 41, and a plurality of communicators 42. The plurality of communicators 42 are arranged in and are connected electrically with the numerical control mechanism 10, the tool storehouse 20, and the transport mechanism 30 respectively, so that the plurality of communicators 42 can be in communication with the processor 41 respectively in order to receive the corresponding commands. The processor 41 may be configured obtain the information received from the plurality of communicators 42, and process the data accordingly, and send corresponding commands to the corresponding communicator 42. The processor 41 can be a central processor unit (CPU), a digital signal processor (DSP) or a microcontroller. The processor 41 can be located on one of the numerical control mechanism 10, the tool storehouse 20, and the transport mechanism 30. In at least one embodiment, the processor 41 can be located independently from the numerical control mechanism 10, the tool storehouse 20, and the transport mechanism 30. In another embodiment, the processor 41 can be located in each of numerical control mechanism 10, the tool storehouse 20, the transport mechanism 30.

Specifically, the numerical control mechanism 10 may include a tool tray 11, a replacing unit 12, and a detecting unit 13. The tool tray 11 is configured to mount and use tools. The replacing unit 12 is configured to replace the tool mounted on the tool tray 11 with a new tool transported by the transport mechanism 30. The detecting unit 13 is configured to detect the tool mounted on the tool tray 11.

The tool tray 11 may include a mounting member 111 and a driving member 112. The mounting member 111 is configured to mount a tool on the tool tray 11 or dismount a tool off from the tool tray 11. The driving member 112 is configured to drive the mounting member 111 to move so as to move the tool on the tool tray 11 to an accessible position of the replacing unit 12.

In at least one embodiment, the driving member 112 can be a slide table cylinder. For a slide table cylinder, a slide table piston is slidably arranged on a piston rod, and the slide table piston moves along the piston rod. In such configuration, the movement of the slide table piston is more stable, and the position control is more accurate, thus it is better to cooperate with the replacing unit 12 to take/place a tool. In at least one embodiment, the driving member 112 can be a rod-less cylinder, but because the rod-less cylinder does not have a piston rod, its action is to move through the piston inside the cylinder to drive the external magnetic coupling platform for operation, or to rely on the sealing belt to dive the platform for operation, a precision or a lifetime of the rod-less cylinder is not as good as the slide table cylinder.

The replacing unit 12 can include a clamping member 121 and a moving member 122. The clamping member 121 is configured to clamp a tool at the accessible position of the replacing unit 12. The moving member 122 is configured to bring the clamping member 121 to move between the transport mechanism 30 and the tool tray 11.

The moving member 122 cooperates with the driving member 112 to facilitate replacing a tool on the tool tray 11 with the new tool transported by the transport mechanism 30. If a current position of the tool tray 11 is not convenient for tool replacement, the driving member 112 can drive the mounting member 111 to move, and then the moving member 122 moves out the tool to cooperate with the transport mechanism 30 to clamp and replace the tool, thus reducing a move distance of the transport mechanism 30. Accordingly, it is more efficient for tool replacement.

Figure 3:
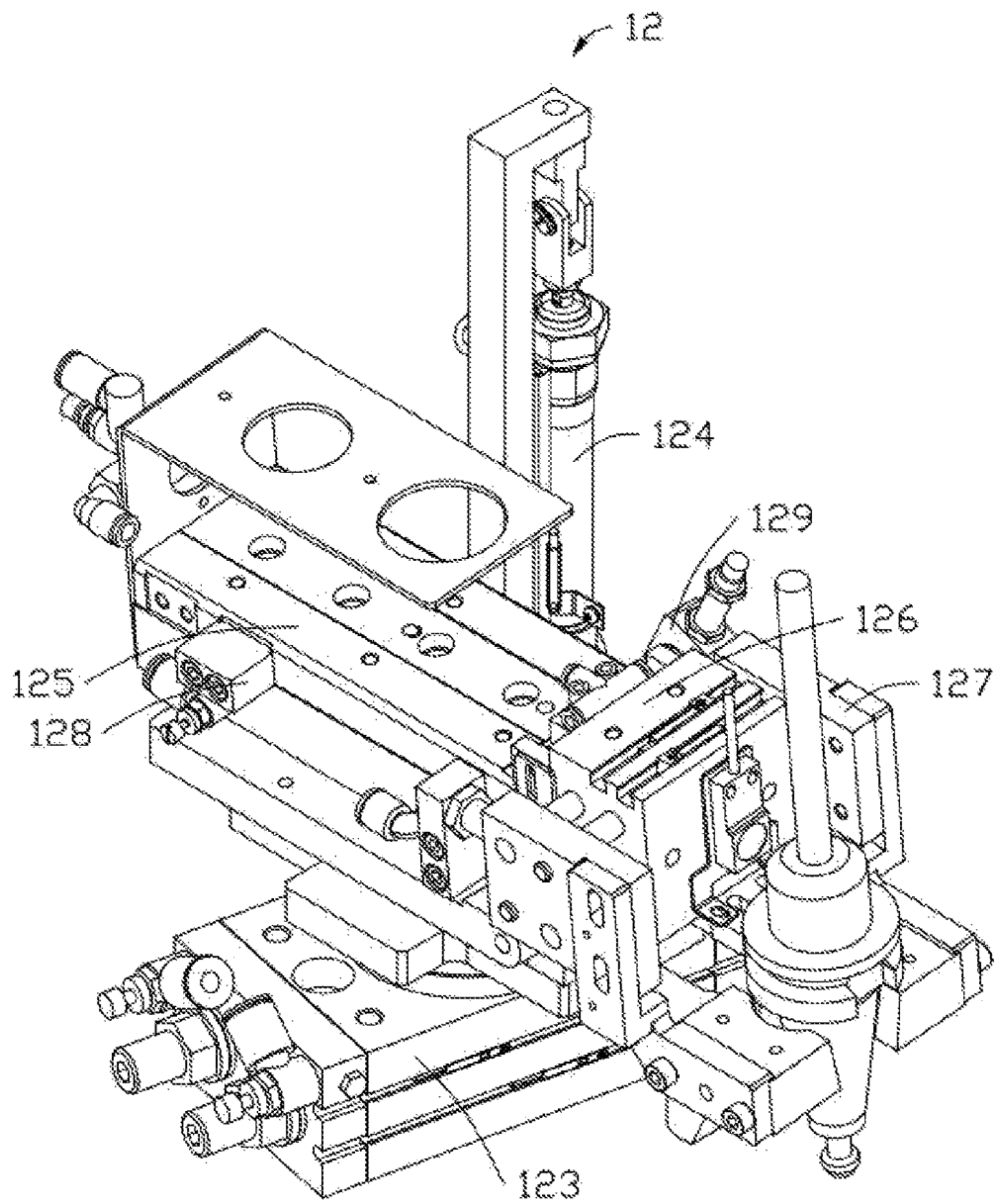
FIG. 3 is a schematic diagram of a replacing unit of a numeric control device according to an embodiment of the present disclosure.
Figure 4:
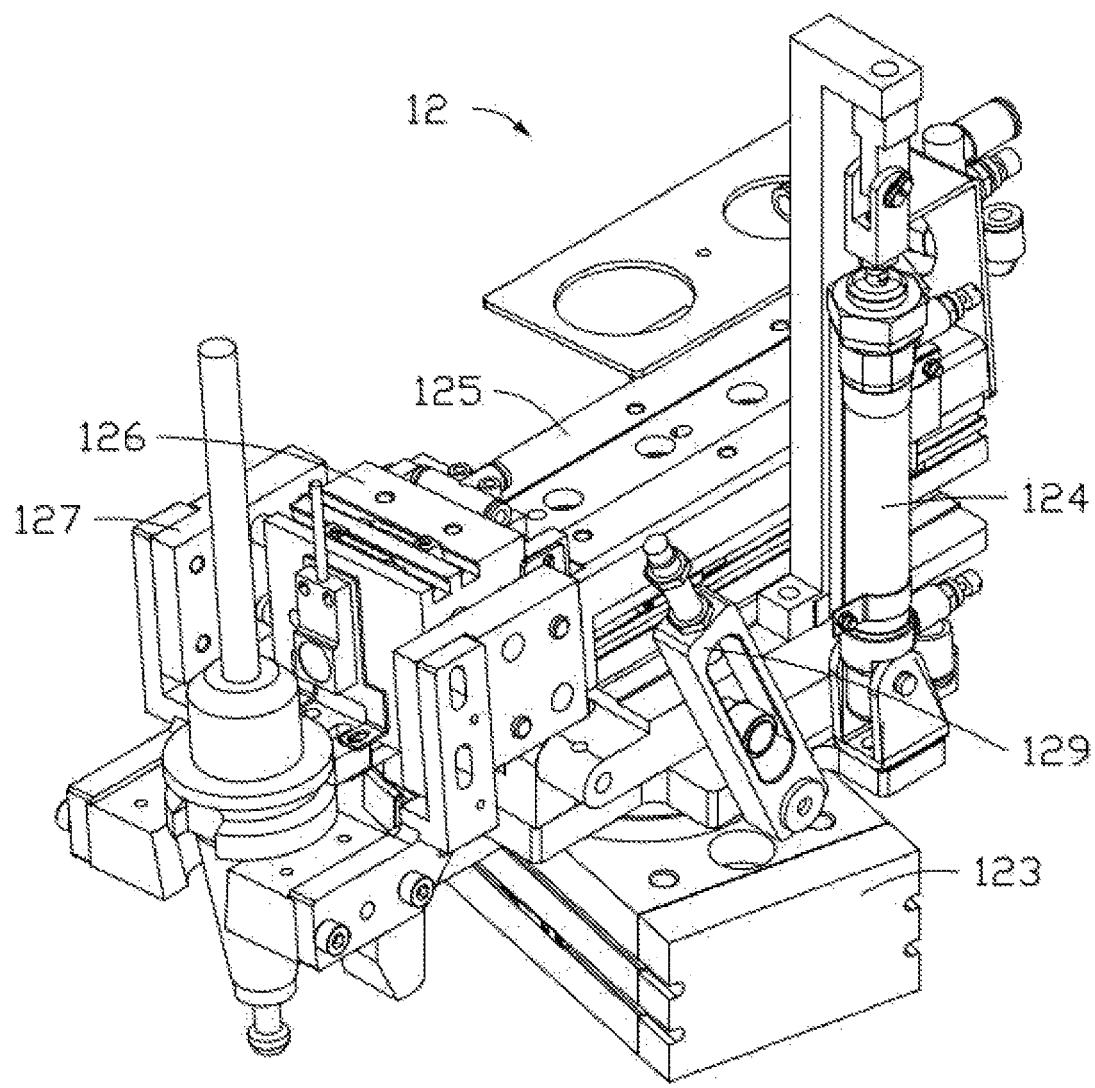
FIG. 4 is a schematic diagram of the replacing unit of FIG. 3 from another view.

Referring to FIGS. 3 and 4, the replacing unit 12 may include a rotating driver 123, a turning drive 124, a telescopic driver 125, a clamping driver 126, a clamping piece 127, a sensor 128 and an angle limit member 129. The rotating driver 123, and turning drive 124, and telescopic driver 125 are configured as the moving member 122, the clamping driver 126 and the clamping piece 127 are configured as the clamping member 121.

The rotating driver 123 is configured to drive the replacing unit 12 to rotate so as to bring the clamping member 121 to rotate between the transport mechanism 30 and the tool tray 11.

The turning driver 124 is arranged on the rotating driver 123 and configured to drive the telescopic driver 125 located thereon to rotate so as to tilt the clamping member 121 towards the tool tray 11. Thus, the clamping member 121 can clamp and release tools on the tool tray 11.

The clamping member 121 is arranged on the telescopic driver 125, the telescopic driver 125 is arranged on the turning driver 124 and is configured to drive the clamping member 121 to move so as to bring a tool to move between the transport mechanism 30 and the tool tray 11.

The clamping driver 126 is arranged on the telescopic driver 125 and is configured to drive the clamping piece 127 to hold or release a tool.

The sensor 128 is configured to sense whether there is a tool on the tool tray 11 or on the clamping member 121 so as to avoid unwanted collision.

The angle limit member 129 is arranged on the rotating driver 123 and is configured to limit a rotating angle of the replacing unit 12.

When the transport mechanism 30 transports the new tool to the numerical control mechanism 10, the replacing unit 12 may receive the command and move the tool off from the tool tray 11 to the transport device 30, and then moves the new tool from the transport device 30 to the tool tray 11, and the new tool is mounted onto the tool tray 11.

The replacing unit 12 moves off from the tool tray 11 to the transport device 30 may include: the replacing unit 12 controls the rotating driver 123 to drive the clamping member 121 to rotate to the side of the tool tray 11. Then, the telescopic driver 125 drives the clamping member 121 to move close the tool tray 11. The driving member 112 drives the mounting member 111 to move so as to move the tool to be replaced on the tool tray 11 to the accessible position of the replacing unit 12. The clamping driver 126 drives the clamping piece 127 to move so as to hold the tool transported by the tool tray 11. The telescopic driver 125 retracts so as to drive the clamping member 121 away from the tool tray 11, and the rotating driver 123 drives the clamping member 121 to rotate to the side of the transport mechanism 30. The telescopic driver 125 drives the clamping member 121 to move to close the transport mechanism 30, and then the transport mechanism 30 clamps and removes the tool.

Mounting the new tool from the transport device 30 onto the tool tray 11 may include: the clamping driver 126 drives the clamping piece 127 to move to hold the new tool transported by the transport mechanism 30. Then, the telescopic driver 125 drives the clamping member 121 to move back. The rotating driver 123 drives the clamping member 121 to rotate to the side of the tool tray 11. The telescopic driver 125 drives the clamping member 121 to close the tool tray 11 and the turning driver 124 drives the clamping member 121 to rotate to tilt, so that the mounting member 111 can take the new tools off from the clamping piece 127. The driving member 112 drives the mounting member 111 to move back to the numerical control mechanism 10. Thus, tool replacement is completed.

The detecting unit 13 is configured to determine a lifetime of the tool on the tool tray 11.

The detecting unit 13 is further configured to detect the new tool on the tool tray 11 so as to adjust the processing parameters of the new tool.

In at least one embodiment, the detecting unit 13 can include a non-contact tool checking instrument, such as a laser tool checking instrument.

The tool storehouse 20 can include a storage chamber 21 and a tool holder 22. The storage chamber 21 is used to store the new tools. The tool holder 22 is used to take out the new tool in the storage chamber 21 for standby under the commands.

The transport mechanism 30 can include a shifting member 31 and a holding member 32. The holding member 32 is configured to hold the tool. The shifting member 31 is configured to drive the holding member 32 to move between the tool storehouse 20 and the replacing unit 12.

In at least one embodiment, the shifting member 31 can be an automatic guided vehicle (AGV). The holding member 32 can be a robot hand.

In at least one embodiment, the transport mechanism 30 can further include a scan unit 33, a position member 34, a storing unit 35, an indicating unit 36, and a stop unit 37. The scan unit 33 is configured to scan an identification of a tool held by the holding member 32 so as to obtain information on the tool. The position member 34 is configured to determine a current position when the transport mechanism 30 is moving. The storing unit 35 is configured to temporarily storage of the tool held by the holding member 32. The indicating unit 36 is configured to prompt an error if there is something wrong with the transport mechanism 30. The stop unit 37 is configured to stop operation of the transport mechanism 30.

In a detailed embodiment, the processor 41 receives warning information and generates a tool replacement task, then controls the tool holder 22 to take out a second tool indicated in the tool replacement task from the storage chamber 21 and prepares the second tool by the tool preparer 22. The processor 41 may obtain a signal that the tool preparation is completed, then the transport mechanism 30 transports the second tool according to the indication of the tool replacement task, and the numerical control mechanism 10 replaces the first tool to the second tool according to the tool replacement task, the processor 41 may complete all tool replacement actions by sending the tool replacement tasks to all mechanisms.

In another detailed embodiment, the processor 41 receives the warning information and generates the tool replacement tasks. The transport mechanism 30 receives the tool replacement tasks and moves to the side of the tool storehouse 20 for standby, and sends a tool preparation task to the tool storehouse 20, such that the tool storehouse 20 can prepare the second tool. After the tool storehouse 20 completes the tool preparation, the transport mechanism 30 takes out the second tool and generates a tool hanging task; after the transport mechanism 30 moves to the numerical control mechanism 10, the tool hanging task is sent to the numerical control mechanism 10, so that the first tool on the numerical control mechanism 10 is replaced with the second tool. In this way, the tool replacement is completed.

Specifically, the tool preparation tasks can include tool information of the first tool, an identification of the second tool, and position information of the second tool in the tool storehouse 20. The tool information of the first tool can prompt a remaining time, a remaining number of tools, and which tool needs to be replaced; the identification of the second tool is used to verify the identity of the second tool, and the position information of the second tool in the tool storehouse 20 is convenient for the storage chamber 21 to move the second tool to the tool holder 22 for tool preparation.

In a detailed embodiment, during working of the first tool, every preset interval or when there is an accidental event occurs, the detecting unit 13 detects the state of the first tool on the tool tray 11. The states of the first tool can include, but not limited to, worn condition, fracture condition, and service time. If any of the state of the first tool approaches to a threshold value, the detecting unit 13 collects tool parameters corresponding to the state of the first tool to generate warning information and sends to the processor 41 through the communicators 42. The processor 41 obtains the warning information and controls the communicator 42 to send the tool replacement task, the tool storehouse 20 prepares the second tool so as to replace the first tool with the second tool through the mounting member 111. Through the interaction of warning information, the tool preparation time can be reduced, and the time of tool replacement for the tool tray 11 to stop can be reduced, thereby increasing the utilization rate of the numerical control mechanism 10.

In at least one embodiment, the tool parameters may include the thickness of a cutting surface of the first tool, etc. The detecting unit 13 estimates the wear value of the first tool according to the thickness of the cutting surface of the first tool and a standard table, and estimates a lifetime of the first tool according to the wear value of the first tool and the standard table, the standard table may include a mapping relationship about tool parameters, tool wear values, tool lifetime. Finally, the detecting unit 13 or the processor 41 determines whether it is necessary to send the warning information according to the lifetime of the first tool and a warning lifetime.

In at least one embodiment, the tool parameters may further include a distance from a sample point on the cutting surface to another surface away from the cutting surface, etc. The detecting unit 13 estimates the fracture value of the first tool according to the distance from the sample point on the cutting surface to another surface away from the cutting surface and the standard table, and estimates the lifetime of the first tool according to the fracture value of the first tool and the standard table, the standard table may include the mapping relationship further about tool parameters, tool fracture values, tool lifetime. Finally, the detecting unit 13 or the processor 41 determines whether it is necessary to send the warning information according to the lifetime of the first tool and the warning lifetime.

In a detailed 1 embodiment, the replacing unit 12 clamps a first tool from the tool tray 11 and places the first tool on the transport mechanism 30, and clamps a second tool from the transport mechanism 30, and places the second tool on the mounting member 111. The mounting member 111 mounts the second tool to complete the tool replacement actions.

In a detailed embodiment, the mounting member 111 releases the first tool and moves the first tool to the accessible position, the clamping member 121 of the replacing unit 12 clamps the first tool and places the first tool at the transport mechanism 30; then the clamping member 121 clamps the second tool from the transport mechanism 30 and places the second tool at the accessible position, such that the mounting member 111 clamps the second tool to complete the tool replacement.

In a detailed embodiment, because the tool tray 11 is located at a processing area, when the mounting member 111 dismounts the first tool, obtains the second tool, and replaces the second tool, it is easy to cause problems such as the risk of collision among the first tool, the second tool and the workpiece fixture, workpiece, and other equipment. In order to avoid such collision, the driving member 112 can drive the tool tray 11 to move from the processing area to a tool replacement area where the tool replacement is performed.

In at least one embodiment, since the clamping member 121 of the replacing unit 12 assists the mounting member 111 to replace the second tool, it is necessary to ensure the installation precision and position accuracy, and it is necessary to check the installation status of the mounting member 111 in a planned way; because the sizes of the tools are difference, in order to avoid the design size of the clamping member 121 being too large or too small or other reasons, therefore the setting position of the moving member 122 needs to be convenient for checking the working status of the clamping member 121 and extending the clamping range of the clamping member 121.

In a detailed embodiment, the driving member 112 is a slide table cylinder, the tool tray 11 is configured as a computer-numeric controlled (CNC) tool tray. The process of clamping the first tool by the replacing unit 12 can include: the slide table cylinder moving towards the tool tray 11, the mounting member 111 dismounting the handle of the first tool, the slide table cylinder taking the handle of the first tool away from the mounting member 111 and releasing the handle of the first tool at the accessible position, the clamping member 121 clamping the first tool from the accessible position and placing the first tool at the moving member 122.

In at least one embodiment, The process of mounting the second tool by the replacing unit 12 can include: the clamping member 121 clamping out the second tool and placing the second tool at the accessible position, the slide table cylinder pushing the second tool into the tool tray 11, and the mounting member 111 mounting the handle of the second tool. The slide table cylinder returns, so that the tool replacement is automatically performed.

In at least one embodiment, Because it is uncertain the number of tools to use during the processing of workpieces, If there are more than three tools needed to be replaced, there will be problems such as different sizes and pacing position of the tools, or the like. Therefore, one of the ways is to locate the numerical control mechanism 10 and the tool storehouse 20 at two different positions respectively. Once the number of tools is too large, due to a distance existing between the numerical control mechanism 10 and the tool warehouse 20, therefore, the actions that need to be performed by the transport mechanism 30 on the tool may include identifying, grasping, moving, storing, controlling, security, etc.

In at least one embodiment, when the holding member 32 of the transport mechanism 30 holds the second tool from the tool holder 22, it needs to ensure that the holding member 32 holds second tool smoothly and the storing unit 35 receives the second tool accurately. The sizes of the tools are different, to avoid the design size of the holding member 32 being too large or too small or other reasons, therefore the setting position of the shifting member 31 needs to be convenient for extending the clamping range of the holding member 32.

In at least one embodiment, the transport mechanism 30 needs to predict the second tool from the tool holder 22, in order to avoid holding a wrong tool, the scan unit 33 scans an identification of the second tool and provides the identification of the second tool to the processor 41 to determine whether the second tool acquired is a proper tool, so as to effectively avoid holding a wrong tool. The identification can be, but not limited to, a bar code or a quick response (QR) code.

In at least one embodiment, if the processor 41 determines that the tools to be held is a proper tool, the position member 34 determines a moving path for the shifting member 31, a start position where the holding member 32 holds the second tool from the tool holder 22, and the clamping position of the replacing unit 12. Then the processor 41 controls the holding member 32 to hold the second tool from the storing unit 35 and the shifting member 31 moves the second tool to the side of the replacing unit 12. The processor 41 controls the communicator 42 so that the replacing unit 12 clamps the second tool from the storing unit 35, finally, the second tool is replaced into the mounting member 111 of the tool tray 11.

In at least one embodiment, the mounting member 111 may get the second tool from the storing unit 35 directly.

In at least one embodiment, before the tool tray 11 stops working, the processor 41 sends a tool replacement task. When the tool warehouse 20 finishes preparing the second tool according to the tool warning information, the scan unit 33 scans the identification of the second tool automatically or manually to obtain the information on the second tool so as to determine whether the second tool is a proper tool. If the second tool is a proper tool, the holding member 32 holds the second tool and places the second tool in the storing unit 35=then the shifting member 31 moves the storing unit 35 to the side of the tool tray 11. If the tool tray 11 is still on work, the transport mechanism 30 waits; if the tool tray 11 stops working, the mounting member 111 replace the first tool with the second tool. Obtaining and moving the second tool is performed before the tool tray 11 stops working, therefore, the efficiency of tool replacement is improved. The tool replacement can be performed automatically so as to save manpower, effectively avoid holding a wrong tool, and warning.

In at least one embodiment, when any one of the scan unit 33, the shifting member 31, the holding member 32, the position member 34, the storing unit 35 and the stop unit 37 fails to work normally, the indicating unit 36 may send an indicating notice to a technician or the processor 41. Therefore, the efficiency of the technicians in solving on-site problems can be improved In at least one embodiment, if the processor 41 determines that the tool to be held is not the proper second tool, the indicating unit 36 outputs an indicating notice to the technicians and the processor 41 to indicate that the tool holder 22 provides a wrong tool.

In at least one embodiment, if the holding member 32 fails to clamp the second tool or fails to place the second tool in the storing unit 35, the indicating unit 36 outputs an indicating notice to the technicians or the processor 41 to indicate that there is something wrong with the holding member 32.

In at least one embodiment, if a living thing is found to block when the holding member 32 is clamping the second tool to storing unit 35, the indicating unit 36 outputs an indicating notice to the technicians and the processor 41 and starts the stop unit 37 to stop the holding member 32.

In at least one embodiment, if there is a block found during the movement of the shifting member 31, the indicating unit 36 outputs an indicating notice to the technicians and the processor 41.

In at least one embodiment, if there is a living thing is found during the movement of the shifting member 31, the indicating unit 36 outputs an indicating notice to the technicians and the processor 41 and starts the stop unit 37 to stop the shifting member 31.

In at least one embodiment, if the technician finds that the processor 41 fails to find transport mechanism 30, he can send a control command through a wireless or a wired network in order to control the communicators 42 to start the stop unit 37 to stop the transport mechanism 30.

In at least one embodiment, after the mounting member 111 finishes mounting the second tool onto the tool tray 11, the numerical control mechanism 10 detects whether the second tool is aligned and in a proper position. If the second tool is not in the proper position, the technician or the processor 41 determines the reasons why the second tool is not in the proper position. If the reason is the second tool is not a proper tool, the technician or the processor 41 controls the numerical control mechanism 10, the tool tray 11, the replacing unit 12, the transport mechanism 30 and the tool warehouse 20 to perform tool replacement again. If the reason is the second tool is worn severely, the indicating unit 36 may output an indicating notice to the technician to indicate that the tools in the tool warehouse 20 should be checked. If the reason is that there is something wrong with the mounting member 111, the indicating unit 36 may output an indicating notice to the technician to indicate that the mounting member 111 should be replaced.

Figure 2:
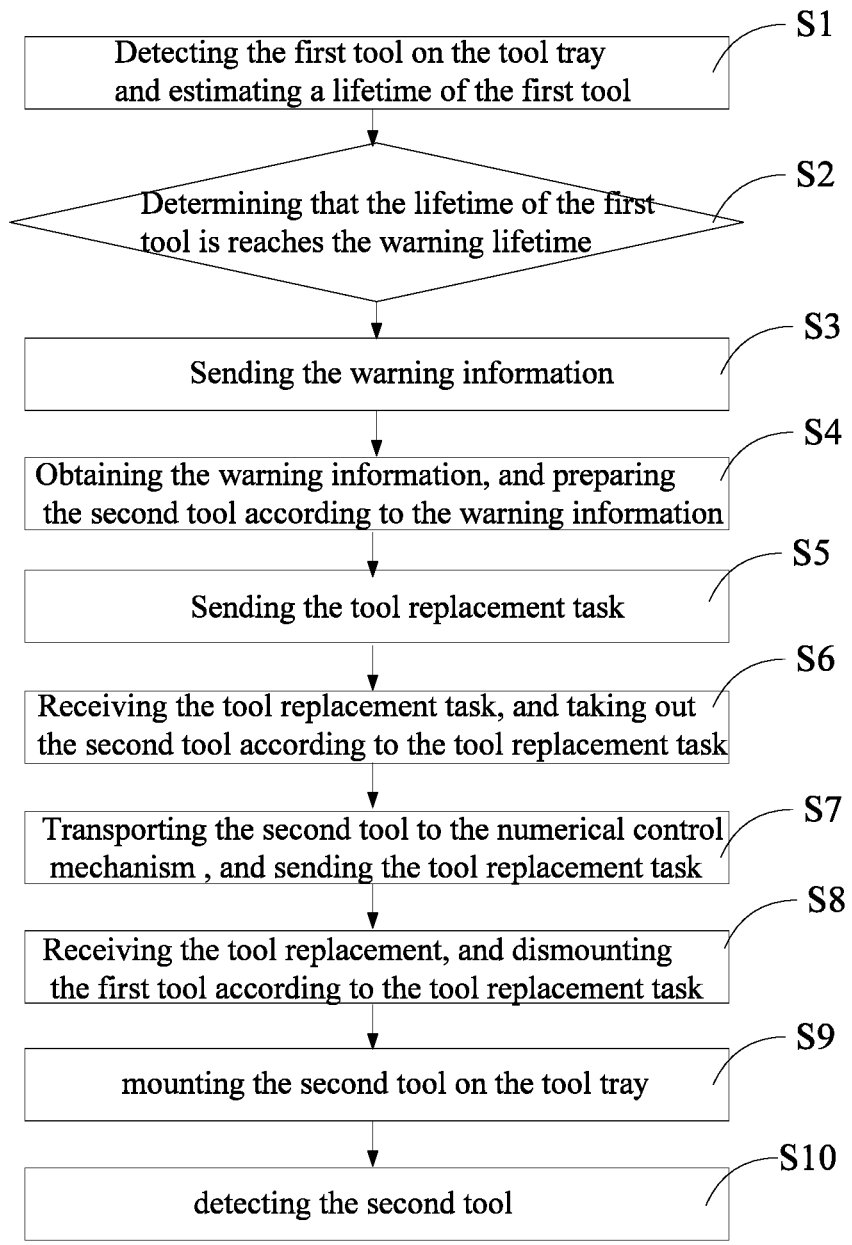
FIG. 2 is a flow chart of a tool replacement method according to an embodiment of the present disclosure.

Referring also to FIG. 2, an embodiment of the present disclosure further provides a method for replacing tools using above mentioned tool replacement equipment 100.

The method is illustrated as an example only. There may be many kinds of similar methods for replacing tools. Each block in FIG. 2 may represent one or more steps or sub-processes. The method or sub-process is executed by the embodiment method. The method includes the following steps:

Block S1, detecting the first tool on the tool tray 11 and estimating a lifetime of the first tool.

In detail, the detecting unit 13 detects the tool parameters of the first tool on the tool tray 11, the tool parameters can include the thickness of a cutting surface of the first tool, etc. The detecting unit 13 estimates the wear value of the first tool according to the thickness of the cutting surface of the first tool and the standard table, and estimates the lifetime of the first tool according to the wear value of the first tool and the standard table, the standard table may include a mapping relationship about tool parameters, tool wear values, tool lifetime.

In at least one embodiment, the mapping relationship of standard table further about tool type, tool sizes, tool length, tool lifetime. The mapping relationship can be determined by Simulation analysis prediction or machine learning.

In at least one embodiment, the tool parameters can further include the distance from the sample point on the cutting surface to another surface away from the cutting surface, etc. The detecting unit 13 estimates the fracture value of the first tool according to the distance from the sample point on the cutting surface to another surface away from the cutting surface and the standard table, and estimates the lifetime of the first tool according to the fracture value of the first tool and the standard table, the standard table may include the mapping relationship further about tool parameters, tool fracture values, tool lifetime.

Block S2, determining that the lifetime of the first tool is reaches the warning lifetime.

In detail, the detecting unit 13 or the processor 41 compares the lifetime of the first tool with the warning lifetime to determine whether the lifetime of the first tool is close the warning lifetime. If the lifetime of the first tool is close the warning lifetime, the process goes to Block S3, otherwise, the process goes back to Block S1.

Block S3, sending the warning information.

In at least one embodiment, the detecting unit 13 or the processor 41 generates the warning information if the lifetime of the first tool is close the warning lifetime, and the communicator 42 of the numerical control mechanism 10 sends the warning information to the tool storehouse 20, the warning information is generated base on the tool parameter (such as tool wear values) generated by the detecting unit 13 of the numerical control mechanism 10 when detecting the first tool.

Block S4, obtaining the warning information, and preparing the second tool according to the warning information.

In detail, the communicator 42 of the tool storehouse 20 receives the warning information and generates a tool preparation task according to the warning information. The tool holder 22 takes the second tool out from the storage chamber 21 according to the preparation task. The tool preparation task includes information on the first tool, the identification of the second tool, and a storage position of the second tool in the storage chamber 21.

In at least one embodiment, the tool preparation task can be initiated by human, or automatically generated by the numerical control mechanism 10 according to the detection result of the detecting unit 13.

Block S5, sending the tool replacement task.

Specifically, the processor 41 generates a tool replacement task according to the tool preparation task and controls the communicator 42 in the tool storehouse 20 to send the tool replacement task to the transport mechanism 30. The tool replacement task can include the identification of the second tool.

Block S6, receiving the tool replacement task, and taking out the second tool according to the tool replacement task.

In detail, the communicator 42 of the transport mechanism 30 receives the tool replacement task, the shifting member 31 moves the holding member 32 towards the tool storehouse 20 according to the tool replacement task, and the holding member 32 clamps the second tool according to the tool replacement task.

In at least one embodiment, the scan unit 33 of the transport mechanism 30 scans the identification on the second tool to determine the tool information of the second tool so as to prevent taking the wrong tool and cause replacement errors 1. The identification can be identifying codes such as bar codes or QR codes, electronic labels or chips.

In at least one embodiment, the position member 34 can help to position the transport mechanism 30 so as to accurately moves the transport mechanism 30 to the tool storehouse 20.

Block S7, transporting the second tool to the numerical control mechanism 10, and sending the tool replacement task.

In detail, the shifting member 31 of the transport mechanism 30 moves to the replacing unit 12 according to the tool replacement. The processor 41 controls the communicator 42 in the transport mechanism 30 to send the tool replacement task to the numerical control mechanism 10. The tool replacement task may include the tool information of the second tool.

Block S8, receiving the tool replacement, and dismounting the first tool according to the tool replacement task.

In detail, the communicator 42 in the numerical control mechanism 10 receives the tool replacement task and the driving member 112 of the tool tray 11 drives the mounting member 111 to move to the accessible position of the replacing unit 12 according to the tool replacement task. The mounting member 111 releases the first tool in the tool tray 11, and the clamping member 121 of the replacing unit 12 clamps the first tool according to the tool replacement task, and then, the moving member 122 moves the clamping member 121 to the transport mechanism 30. The clamping member 121 releases the first tool, then places the first tool in the storing unit 35 of the transport mechanism 30.

Block S9, mounting the second tool on the tool tray 11.

In detail, the clamping member 121 clamps the second tool from the transport mechanism 30 according to the tool replacement task, the moving member 122 moves the clamping member 121 to the accessible position, the clamping member 121 releases the second tool, The mounting member 111 in the tool tray 11 clamps the second tool, and the driving member 112 in the tool tray 11 drives the mounting member 111 to move back. In this way, the tool replacement is completed.

In at least one embodiment, the method can further include block S10: detecting the second tool.

In detail, when the second tool is mounted in the tool tray 11, the processor 41 controls the communicators 42 to send a detection command to the detecting unit 13, the detecting unit 13 detects tool-setting of the second tool in the tool tray 11 according to the detection command to obtain a detection result of the tool-setting, and sends the detection result of the tool-setting to the numerical control mechanism 10, so that the numerical control mechanism 10 can adjust processing parameters according to the detection result of the tool-setting.

In at least one embodiment, it can be appreciated that after the first tool is placed in the transport mechanism 30, the method can further include a block: moving the first tool to a tool recycle unit that storing waste or old tools. The tool recycle unit can be arranged separately or arranged in the tool storehouse 20.

In at least one embodiment, it can be appreciated that if there is no first tool in the tool tray 11, block S8 can be omitted without affecting the tool replacement of the tool replacement equipment 100.

The tool replacement equipment 100 and the tool replacement method, which are used for detecting and warning for the tools, and then replacing the tools according to the warning information, so as to reduce manpower, and the waiting time for the tool replacement, the tool replacement efficiency can be improve.

In addition, those skilled in the art can make other changes within the spirit of the present disclosure. Of course, these changes made in accordance with the spirit of the present disclosure should all be included in the scope of protection claimed by the present disclosure.

What is claimed is:

1. A tool replacement equipment, comprising:
a transport mechanism, configured to:
receive a tool replacement task;
take out a second tool from a tool storehouse according to the tool replacement task; and
transport the second tool to a numerical control mechanism so as to replace a first tool of the numerical control mechanism with the second tool;
wherein the numerical control mechanism comprises:
a tool tray; and
a replacing unit, coupled to the tool tray, the replacing unit comprises:
a clamping member, configured to:
clamp the first tool from the tool tray;
place the first tool to the transport mechanism:
clamp the second tool from the transport mechanism at an accessible position;
place the second tool to the tool tray to complete the tool replacement task; and
a moving member, configured to move the clamping member between the transport mechanism and the tool tray to adjust the second tool to the accessible position when there is a distance between the second tool and the tool tray;
wherein the moving member comprises:
a rotating driver, configured to drive the replacing unit to rotate so as to bring the clamping member to rotate between the transport mechanism and the tool tray;
a turning driver, arranged on the rotating driver and configured to drive a telescopic driver located thereon to rotate so as to tilt the clamping member towards the tool tray; and
the telescopic driver arranged on the turning driver and configured to drive the clamping member to move.

2. The tool replacement equipment according to claim 1, wherein the transport mechanism is further configured to:
generate a tool preparation task according to the tool replacement task, and send the tool preparation task to the tool storehouse to prepare the second tool;
take out the second tool and generate a tool hanging task;
transport the second tool to the numerical control mechanism, and send the tool hanging task to the numerical control mechanism so as to replace the first tool with the second tool.

3. The tool replacement equipment according to claim 2, wherein
the tool preparation task comprises tool information of the first tool, an identification of the second tool, and position information of the second tool in the tool storehouse;
the tool preparation task is used to:
enable the tool storehouse to locate the second tool according to the position information, and determine whether the second tool acquired is a proper tool base on the identification of the second tool.

4. The tool replacement equipment according to claim 3, wherein the transport mechanism comprises:
a scan unit, configured to scan the identification of the second tool for confirming the tool information of the second tool;
an indicating unit, configured to prompt an error during handling; and
a stop unit, configured to stop operation of the transport mechanism.

5. The tool replacement equipment according to claim 1, wherein the replacing unit further comprises:
an angle limit member, arranged on the rotating driver and configured to limit a rotating angle of the replacing unit; and
a sensor, configured to sense whether there is a tool on the tool tray or on the clamping member.

6. The tool replacement equipment according to claim 1, wherein, the clamping member comprises:
a clamping piece; and
a clamping driver, arranged on the telescopic driver and configured to drive the clamping piece to hold or release the first tool and the second tool.

7. A tool replacement equipment, comprising:
a numerical control mechanism; and
a transport mechanism configured to receive a tool replacement task, take out a second tool from a tool storehouse according to the tool replacement task, and transport the second tool to the numerical control mechanism so as to replace a first tool of the numerical control mechanism with the second tool;
wherein the numerical control mechanism comprises:
a tool tray; and
a replacing unit coupled to the tool tray, the replacing unit comprises:
a clamping member configured to clamp the first tool from the tool tray, place the first tool to the transport mechanism, clamp the second tool from the transport mechanism at an accessible position, and place the second tool to the tool tray to complete the tool replacement task; and
a moving member comprising:
a rotating driver configured to drive the replacing unit to rotate so as to bring the clamping member to rotate between the transport mechanism and the tool tray;
a turning driver arranged on the rotating driver; and
a telescopic driver arranged on the turning driver, the clamping member is arranged on the telescopic driver, the turning driver is configured to drive the telescopic driver to rotate so as to tilt the clamping member towards the tool tray, and the telescopic driver is configured to drive the clamping member to move between the transport mechanism and the tool tray.

8. The tool replacement equipment according to claim 7, wherein the transport mechanism is further configured to:
generate a tool preparation task according to the tool replacement task, and send the tool preparation task to the tool storehouse to prepare the second tool;
take out the second tool and generate a tool hanging task;
transport the second tool to the numerical control mechanism, and send the tool hanging task to the numerical control mechanism so as to replace the first tool with the second tool.

9. The tool replacement equipment according to claim 8, wherein
the tool preparation task comprises tool information of the first tool, an identification of the second tool, and position information of the second tool in the tool storehouse;
the tool preparation task is configured to:
enable the tool storehouse to locate the second tool according to the position information, and determine whether the second tool acquired is a proper tool base on the identification of the second tool.

10. The tool replacement equipment according to claim 9, wherein the transport mechanism comprises:
a scan unit, configured to scan the identification of the second tool for confirming the tool information of the second tool;
an indicating unit, configured to prompt an error during handling; and
a stop unit, configured to stop operation of the transport mechanism.

11. The tool replacement equipment according to claim 7, wherein the replacing unit further comprises:
an angle limit member, arranged on the rotating driver and configured to limit a rotating angle of the replacing unit; and
a sensor, configured to sense whether there is a tool on the tool tray or on the clamping member.

12. The tool replacement equipment according to claim 7, wherein, the clamping member comprises:
a clamping piece; and
a clamping driver, arranged on the telescopic driver and configured to drive the clamping piece to hold or release the first tool and the second tool.

\* \* \* \* \*